Fig. 4.

Patented July 1, 1952

2,601,904

UNITED STATES PATENT OFFICE 2,601,904

METHOD AND APPARATUS FOR TREATING CRUDE OIL EMULSIONS FROM OIL WELLS

Ransome W. Erwin, Houston, Tex., assignor to Salt Water Control, Inc., Fort Worth, Tex., a corporation of Texas Application December 3, 1946, Serial No. 713,708

40 Claims. (Cl. 183—2.70)

The invention relates to improvements in method and apparatus for treating crude oil emulsions from oil wells.

An object of the invention is to provide an improved compact and efficient arrangement of heating, washing, and settling means for the purpose of breaking down emulsions of crude petroleum and water, and to effect the further thorough separation of the water and petroleum from each other. This is accomplished in accordance with my invention with a minimum amount of fuel for heating, a minimum loss of light vapors from the oil, a minimum loss of oil with the water, a minimum carry-over of water with the oil, and a minimum requirement of labor and materials for constructing and assembling the treating system to be disclosed.

A further object of the invention is to provide a highly flexible system that will lend itself to the changing operation conditions of an oil producing well and operate with maximum efficiency as more and more water is progressively produced with the oil. Generally, when oil wells are first put on production they produce little or no water; then as the oil reservoir is further and further exhausted, water comes in and steadily increases in percentage with reference to the oil until, finally, the well is producing nearly all water. When it becomes uneconomical to lift all this water with what little oil is produced, then the well is plugged and abandoned. When a well first starts producing water, this water usually comes combined with the oil as emulsion. In such operation no free water exists, and hence the dropping out of free water prior to heating the mixture is not here required. Usually in such cases the emulsion is "tight" and the oil requires vigorous washing and settling in order to break this emulsion and remove the comparatively small traces of water. The unique adaptability of my new system to such a problem will be apparent from the further detailed description of the invention.

Another object of the invention is to provide clean, filtered water for sub-surface injection in a "closed" type injection system if desired, as described in my Patent No. 2,261,100.

Still another object is to provide a simple, workable horizontal type of emulsion treating system that possesses the advantages ordinarily common to the conventional vertical type of emulsion treater, while omitting the objectionable features inherent in such a vertical type, thus combining good features attainable only in a horizontal type with those of the vertical type.

A further object of my invention is to provide an emulsion treating system that operates fully under gas or flowing pressure throughout from one compartment to the next, and which may be installed either upstream or downstream from the oil and gas separator tank as circumstances require.

Another object is to provide a continuous flow of fluids under pressure from one compartment or wash chamber to the next, instead of relying upon the gravitational flow caused by oil-water density differences as in most conventional systems, thus insuring a thorough and steady means of dispersing the emulsion in the hot water wash zones, thereby minimizing the number of washing steps and reducing the consumption of emulsion breaking chemicals.

A further object is to provide simple, reliable means for returning hot treated out water from a lower pressured hot zone back to a higher pressure upstream free water knockout zone, thus utilizing the heat of the treated out water. In my vertical type treater as described in my Patent No. 2,261,101 the water may gravitate from a hot zone to a cold free water knockout zone, but in a pressured flow horizontal treater this is impossible to obtain without using some source of power to move the hot water back upstream to the cold zone. This is one advantage inherent in a vertical type treater which is at least partially overcome by my simple water return arrangement as will be more fully described hereinafter, thus making this important feature also available in a horizontal type system. However, if the free water knockout is sufficiently efficient in dropping out most of the water, then little advantage is gained in returning hot treated out water to knockout. In this case the simplest cheapest hookup is to use a diaphragm dump valve similar to the one used on the water outlet of the free water knockout rather than a gas operated blow case or dump chamber as will be subsequently described. If the diaphragm dump valve is used, then the hot water from the lower pressured hot zone joins the water from the cold zone after it leaves the free water knockout going to the disposal pit or well.

Another object is to provide safe, easily accessible means of entrance to all baffle sections, heating, free water knockout, settling and filter or excelsior zones for the purpose of inspection and cleaning.

Another object is to so arrange the final oil settling zone as to permit gases passing with the oil to by-pass the filter section just as the oil reaches same, the gas going upward and over said filter or settling zone, while the oil passes through filter or settling zone, undisturbed by the gas. This arrangement is to be desired in case the operator does not choose to use a gas vent valve in the hot chamber, or in case the gas vent valve fails to function. Also, it is sometimes desirable to let gas go on with oil through hot wash zones as it helps disperse the oil and give better contacting of the oil with the hot water.

Another object of the invention is to provide for successive treatments of emulsion fluid under varying pressure conditions in separate chambers, each chamber having an upper gas zone above the liquid level, successive gas zones being of successively decreasing pressures owing to the fact that the flowing pressure of the fluid undergoing treatment diminishes in successive chambers due to the friction which must be overcome by the fluid being treated in passing from chamber to chamber through the various restricted openings connecting said chambers.

Another object is the provision of simple means, such as a float actuated valve, to remove gas from the heating zone as it is liberated by heat, thereby by-passing this gas around the washing and settling zones and delivering it to the clean treated oil or to any other place desired. This avoids turbulent disturbance of the oil-water liquids in the final settling zone, adding greatly to the settling capacity in a given length of time and a given size space for settling. These and other objects and features will be apparent from the following discussion of the advantages offered by this new type of emulsion treater:

ADVANTAGES OF INVENTION

(A) Over conventional vertical types (1) Being horizontal the improved apparatus may be mounted on low supports with much lighter and cheaper hoisting equipment than is required to support tall vertical vessels on its foundations.

(2) The improved apparatus requires less time and labor to assemble and equip with piping as it is much more accessible and has no high pipe risers to be built and hooked on as do most vertical units, and accordingly the present type of apparatus is much safer for workmen to assemble than is apparatus of the vertical type.

(3) My improved apparatus requires less piping for the water outlet, clean oil outlet, untreated fluid inlet, and the gas outlet. There is an actual saving of approximately 100 feet of four-inch pipe in risers alone as compared to a comparable vertical system.

(4) Operating under gas or flowing pressure, rather than by gravity, my improved apparatus may use smaller diameter piping from one zone to the next than would be required in a vertical system of equal capacity, thus saving much in piping material cost.

(5) Since the cross-sectional oil-water contact area is a chief capacity factor in the functioning of a free cold water knockout in any type of treating system, the horizontal arrangement offers much more area and capacity for a given diameter vessel than does the vertical type. Thus, a 10 foot length of a 6 foot diameter horizontal treater half full of oil and half full of water would provide 60 square feet of settling surface. A 6 foot vertical vessel would provide 28.27 square feet of settling surface only, no matter how deep this zone might be. Hence, in order to achieve 60 square feet of settling surface area in a vertical unit one would have to use an 8.75 foot diameter vessel which would be considerably more expensive both for labor costs and materials required. Also, the larger the vessel the thicker must be its walls to withstand comparable working pressures. Thus it is cheaper to use a horizontal type treater and simply make it greater in length if more settling area is desired, which may be done at a very nominal material and construction cost, as compared to increasing the diameter.

(6) Vessels of different capacity having uniform diameters, such as 6 feet for example, may be used exclusively, the capacity of a given system being solely governed by its length, thus providing uniform baffles, heads, and uniform heating element diameters and manways for the various capacities demanded. This greatly simplifies manufacturing problems, permits standardization, and provides considerable savings in manufacturing costs of the system as contrasted to costs where vessels of several different diameters must be constructed as the demand for different capacity units arise.

(7) The horizontal unit is easier to clean out and inspect than the vertical unit, since a man can stand on the ground and perform every operation required, whereas vertical type units call for scaffolding or platforms in order to clean out elevated sections, resulting in much inconvenience, greater cost and decreased safety for workmen.

(8) The horizontal design is an improvement over the disclosure in my Patent No. 2,261,101 with respect to my unique double jacket combination insulator-heat exchanger. In the vertical type apparatus it has proved practicable to build the jackets about the portion only above the heating element, thus failing to insulate or salvage the great amount of heat lost on the walls surrounding the heater element. In my new horizontal form of apparatus it is possible to completely surround the walls about the heating element with this double jacket, thereby resulting in considerable improvement over the old vertical arrangement.

(9) Most popular vertical type treaters have horizontal sloping baffles which readily become loaded with corrosive sediments of iron sulfide, carbonates of calcium and magnesium, mud and sand. This presents a serious problem of cleaning, maintenance and corrosion of the baffles. These objections are overcome in my unique horizontal treater baffle arrangement, where the baffles are nearly vertical and thus do not become loaded with sediment. Such sediment as does form falls to the bottom portion of the horizontal shell and may be readily and easily cleaned out through the roomy, easily accessible manways and handholes provided for each zone in my improved horizontal type treating system. The baffles themselves are very accessible to scraping tools wielded by a man standing on the ground, while no vertical type treaters can offer such advantages.

(B) General advantages over any type system (1) If little free water is being produced with the oil at the time an emulsion treater is installed, then no free water knockout chamber it might possess would function, and accordingly there would be idle space and capacity, this condition continuing possibly for several years before greater volumes of water would be produced. This, of course, would constitute a great waste and expense. In my horizontal treater I have provided a novel and unique arrangement whereby by use of simple valves and piping this free water knockout may be bypassed by incoming fluids, sending them directly to the heating chamber and then using what was formerly the free water knockout chamber as a final settling space for the hot washed oil. Thus there would be put to good use space which would otherwise not be used for months or years. Then when more water is produced and a free water knockout is needed and desired, the system may be re-arranged to use this space as it was originally intended simply by plugging two holes and opening and closing a few valves. So far as this inventor knows, no other treating system offers this dual usage of the free water knockout space.

(2) A uniquely located float controlled valve arrangement in the top portion of the heating chamber which is a characteristic feature of my invention permits removal of gas prior to the entrance of oil emulsion into the wash and settling sections, which is very advantageous as compared with conventional types of emulsion treaters. In cases where little gas is dissolved in the oil the gas vent valve would not be required and, hence, may be easily omitted.

(3) Since my improved system operates with flow pressure from zone to zone and baffle to baffle, smaller holes may be used in the spreaders than could be used in conventional gravity flow treating systems because in them undue restriction to flow would cause the liquid levels to build up and flood each respective compartment supplying fluids to the spreader. My improved system provides more and finer streamlets, resulting in more surface contact of the emulsion with the hot water, all of which features are direct functions of emulsion breaking. It may be readily seen that more intense contacting would lessen the needed number of washing compartments and thereby give a greater capacity for a given size washing zone as compared to conventional gravitational flow types. My improved system also permits use of smaller amounts of emulsion breaking chemicals than are usually required in other types of treating units.

(4) Since each chamber and baffle section in my system has an isolated gas zone above it, each section and zone acts as a cushioned surge absorber, which, in combination with the restricted forced flow through each succeeding spreader, provides a smoother and more continuous flow with diminishing pressure from chamber to chamber through the system as a whole despite "heading" or uneven discharge of oil wells into the system. This smooth even flow is highly essential to efficient emulsion breaking and oil dehydration, especially in small, compact systems designed to save expensive construction and materials. In all systems with which the inventor is acquainted, once the liquids enter the system the entire flow sheet consists of continuous liquids with no gas intervals to absorb uneven flows. Nor would a gravitational type system lend itself readily to the absorption of such unevenness in flow as this has to be offset in other systems by building the equipment larger so that they can absorb such shocks or "heads." My pressured, zone to zone shock absorbed, even flow system is believed to be novel.

(5) The float controlled accumulator arrangement which is a characteristic feature of the present invention permits return of hot treated out water from the hot zone to upstream free water knockout zone, a result which is accomplished by gravitational flow in my vertical type treater as shown in my Patent No. 2,261,101. This could not be done by gravitational methods in any completely horizontal treating system, hence a need for a simple powered means of returning this water arises, and this is a novel and characteristic feature of the present invention.

(6) In any type of treating system it is highly desirable that as little gas as possible escape with the water discharged from the system. This is essential to good level control, and the loss of the gas is an economic waste. The retention and utilization of the gas is accomplished in my system by having an adequate degassing cylinder or chamber for the water to enter after it leaves the level control means, just prior to passing it through the diaphragm dump valve. Gas trapped out in this chamber is returned to the main chamber supplying the water by means of a pipe, thus maintaining static gas conditions in the system as desired.

(7) Another advantage possessed by the present system in common with the systems disclosed in my prior patents as represented by Nos. 2,261,057; 2,261,101 and 2,354,856, and in contrast to other systems is that all of the water may be filtered before leaving the system. This filtering operation removes foreign matter that would be detrimental to sub-surface disposal of water, and removes and saves entrained oil that would otherwise be lost with the water.

(8) My improved system is a pressure operating system and may be operated ahead of the regularly used lease oil and gas separator, taking out the water and transmitting clean, cooled oil and gas to the separator. From the separator the oil goes to storage tanks and the gas with its rich gasoline vapors goes to an extraction gasoline plant where all these valuable ends are recovered.

(9) An elongated and comparatively slender heating unit which is characteristic of my improved system insures an equal distribution of heat in the heating zone and thorough contact of oil with the heating element and with the hot wash zone.

The invention will be more readily understood by reference to the accompanying drawing and the following detailed description in which are set forth an illustrative embodiment of the inventive thought.

GENERAL CONSTRUCTION

Referring to the drawings in detail, the reference numeral 10 denotes generally my improved treating vessel which is in the form of an elongated cylinder suitably supported on piers or the like 11 and 12 resting upon the ground or other surface.

The treater is preferably divided lengthwise by means of suitable partitions or plates into various treating zones or chambers wherein different operations are performed. At the right end of the treater is a heating chamber or hot zone A which extends from the right hand end of the treater to an inclined partition plate 50 which separates the heating chamber A from a washing and baffling chamber or zone B composed of a series of inclined partition plates each having an opening near the top through which extends one end of a down pipe having a spreader at the lower end thereof.

To the left of the baffling zone B is a filtering or settling chamber or excelsior zone C which is separated from the baffling zone by a perforated partition plate 63 having teat like projections thereon. The other end of the filtering or settling chamber C terminates in a partition plate 37 which separates the chamber C from a water knockout chamber or zone D which extends to the left end of the treating chamber.

The primary function of the heating chamber or zone A is to initially supply heat to the fluid to be treated and to separate out a portion of the gas carried therewith. This chamber is preferably jacketed to conserve heat and the jacket may be of the heat exchange type wherein the incoming fluid to be treated is preheated in passing through the jacket and hot clean oil from which the water has been separated is cooled prior to its passage from the system.

The primary function of the baffling chamber B is to break up the emulsion and at least partially separate the oil and water constituents thereof prior to their passage into the filtering or settling zone C.

In the filtering or settling zone C oil is filtered or settled and from the top of this zone clean oil is withdrawn, then cooled by heat interchange with the incoming fluid to be treated, and then withdrawn from the system. The water or brine is withdrawn from the lower portion of the filtering or settling zone and returned to the free water knockout chamber D, or discharged through a diaphragm dump valve to a disposal pit or well.

Into the free knockout water chamber D the emulsion which has preferably been preheated by means of the preheating jacket surrounding the heating chamber A is discharged, and in this chamber separation of free water from the emulsion takes place as well as separation of a portion of the gas contained in the fluid to be treated. An excelsior filter is preferably provided at the bottom of the chamber for removal of any traces of oil from the water prior to its discharge from the system. However, in some cases this filter material is not required.

The chamber A is provided with a heating element 13, herein shown as comprising a horizontal inlet pipe 14 connected by a vertical pipe 15 to a horizontal outlet pipe 16 leading to a stack or discharge pipe 17 outside the treating vessel. Heat may be supplied by means of a suitable burner 18 adapted to discharge hot combustion gases into the horizontal pipe 14 of the heating element, the burner being supplied with fuel through pipe 19 controlled by a valve 20. The heating unit may be readily removed for cleaning or to permit access to the interior of the treating vessel, being carried by a removable manhole cover or plate 21 in one end wall of the treater. Such a heating unit is shown in my Patent No. 2,495,673, dated January 24, 1950.

The zone occupied by the heating element 13 and the space adjacent thereto constitutes the heating zone or chamber. This end of the treater is preferably encased by a double walled exchange jacket comprising an outer wall 22 and an intermediate wall 23. The wall 23, together with the wall 10 of the treater itself provides a preheating jacket 24 for the incoming fluid entering through inlet 25 composed of oil, gas, emulsion and water from the well or an oil gas separator, the proportions of each of these ingredients in the incoming fluid varying in each individual case. An outer jacket 26 formed by walls 22 and 23 serves to cool the stream of cleaned hot oil entering the outer jacket from below through horizontal pipe 27 from stand pipe 28 prior to its passage from the system through oil outlet pipe 29. The flow of oil into the outer jacket through pipe 27 may be controlled by means of a suitable valve 30. However, this unit may be readily operated with the internals as shown without having either or both of the jackets, the piping being made simply to not include the jackets in their course. The jackets function as preheaters, heat exchanger coolers, and insulators for the hot end of the vessel.

Figure 3:
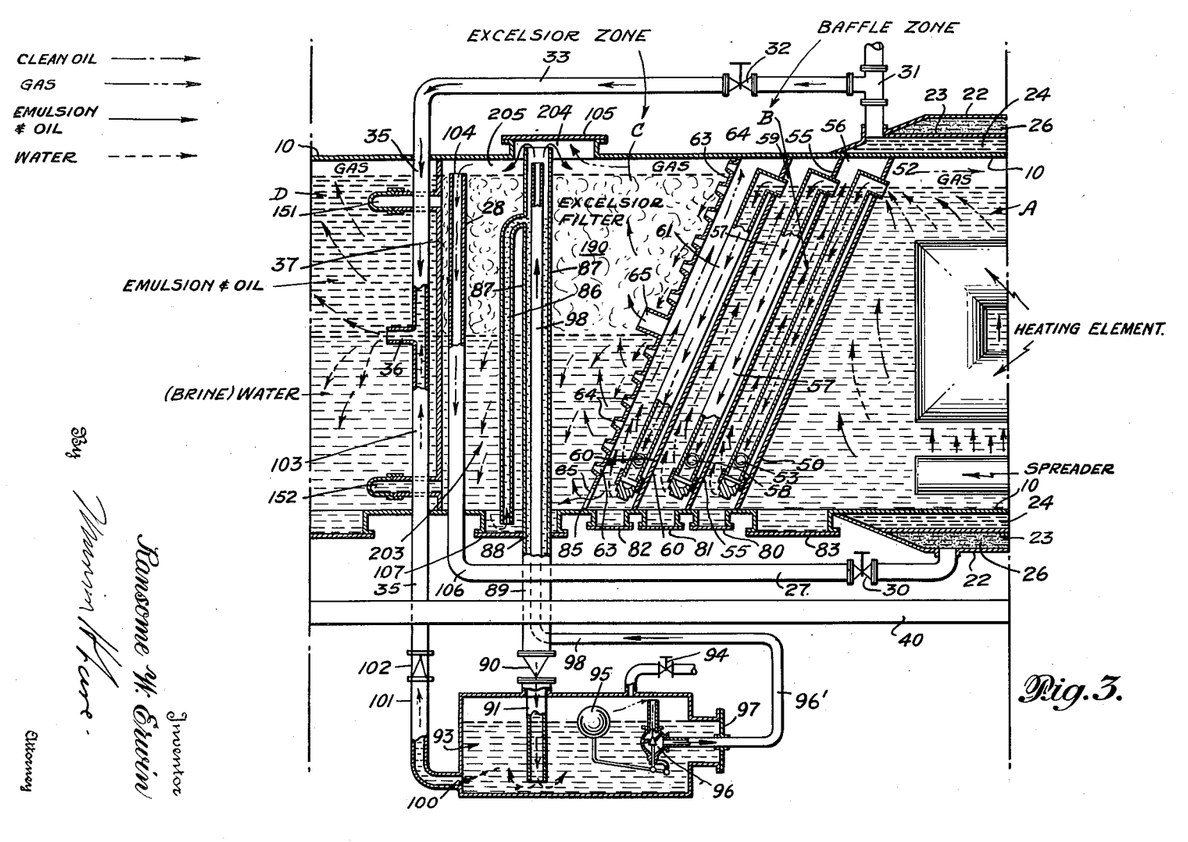
Fig. 3 is a similar view of the baffling and filtering or settling zones together with portions of the adjacent heating and water knockout chambers or zones and portions of the pipe lines and flow control means associated therewith.
Figure 4:
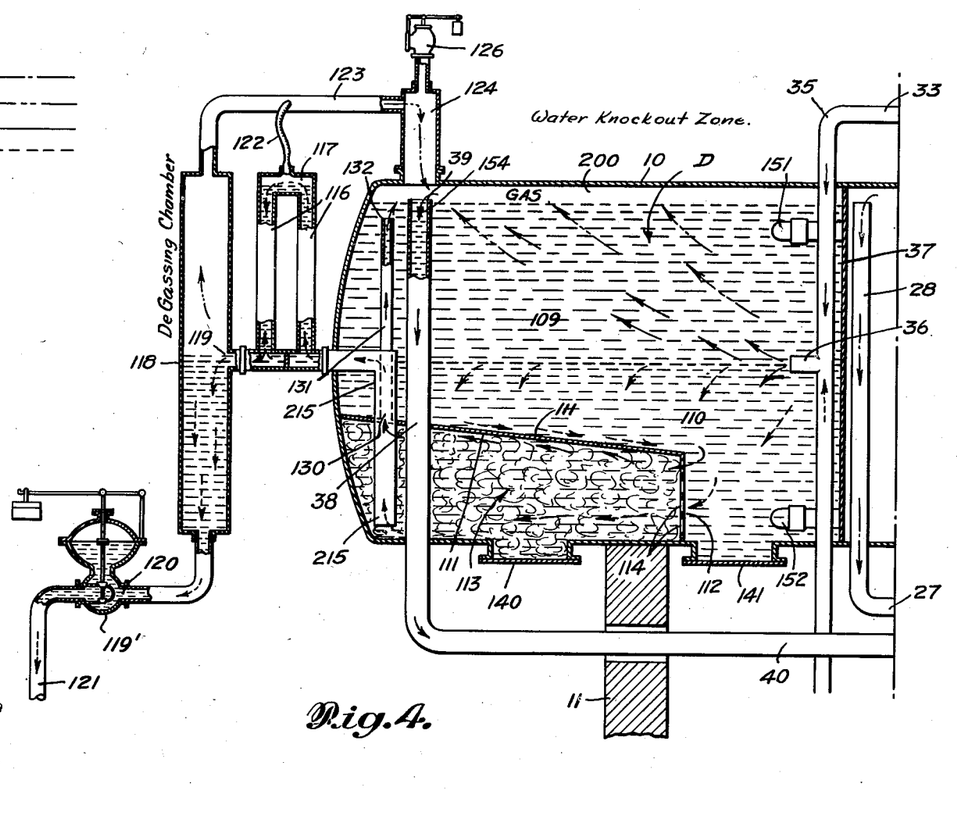
Fig. 4 is a similar view of the water knockout zone together with a portion of the adjacent filtering zone and portions of the pipe lines and flow control means associated therewith.

The incoming fluid containing oil, gas, emulsion and water enters the inner jacket 24 through the inlet 25 under flowing pressure and passes up and around the main vessel shell 10 where it picks up heat normally radiated to atmosphere from the hot vessel, and also absorbs heat from the cleaned hot oil in outer jacket 26, thereby cooling it prior to its leaving the system. The preheated fluid passes out of the inner jacket 24 through conduit 31, passes through opened valve 32 and pipe 33 (valve 34 being closed) into an inside riser pipe 35. The fluid to be treated is discharged into the free water knockout chamber D through opening 36 (Figs. 3 and 4). The chamber D is at the opposite end of the treater vessel from the heating zone A and is separated from the remainder of the vessel by means of the vertical partition 37.

Near the opposite end of the chamber D from the riser pipe 35 through which the preheated emulsion enters the chamber is a second riser pipe 38 which opens a few inches below the top of the chamber D, thus permitting some gas to accumulate in the upper portion 200 of the chamber while the excess gas continues with liquids through the outlet riser 38 and passes from the chamber.

Emulsion enters riser 38 at point 39, goes through pipe 40 and open valve 41 (valve 42 being closed) to point 43 where it enters an elongated spreader 44 located in chamber A below the heating element 13. The emulsion leaves all along the spreader through holes 45 and passes upwardly through the hot water in the heating zone, contacting heating element 13, then passing upwardly and accumulating in the hot upper portion of chamber A. Here most of the gas is liberated due to heating and accumulates in the upper zone 201 of the heating chamber.

The gas may be removed either by means of a float controlled valve 46 out through pipe 47 to the clean oil line 29 through valve 48, or to any desired place through valve 49, or it may be sent on through the system with the oil, emulsion and water and not discharged at this point at all, where only small amounts of gas are present.

HEATING CHAMBER A

The chamber or hot zone A is formed by the end of the main vessel, the main vessel shell and the inclined partition 50 located a short distance beyond the end of the heating element 13 and separating the heating zone A from the baffling zone B. The chamber A remains full of liquid under all conditions except for the gas zone 201 at the top of the chamber, assuring complete immersion of the heating element at all times.

WASHING AND BAFFLING CHAMBER B

Hot oil and emulsion and water leave the upper portion of the chamber A and enter a downpipe 51 at a point 52 near the top of partition 50. This fluid passes down pipe 51 to a cross pipe or spreader 53 (see Fig. 5), which spreader is perforated with small holes 54. Here the fluid is forced out into a washing and baffling section between partition 50 and a second partition plate 55 in fine streamlets. The fluid washes through water upwardly to a point 56 beneath partition plate 55 and enters pipe 57. The fluid moves down pipe 57 to spreader pipe 58 similar to cross pipe 53 and thence into the next baffle section in zone B to repeat the operation carried out in the preceding baffle section. The fluid is then washed back up to a point 59 under plate 60 where it enters downpipe 61 and discharges through a spreader 62 which is similar to spreader pipes 53 and 58. The purpose of this intense baffle scrubbing and dispersion is to break down any remaining emulsions into oil and water droplets of larger size. As many baffle sections as needed may be used in the zone B, the unit being designed to fit each particular job.

Figures 1, 5:
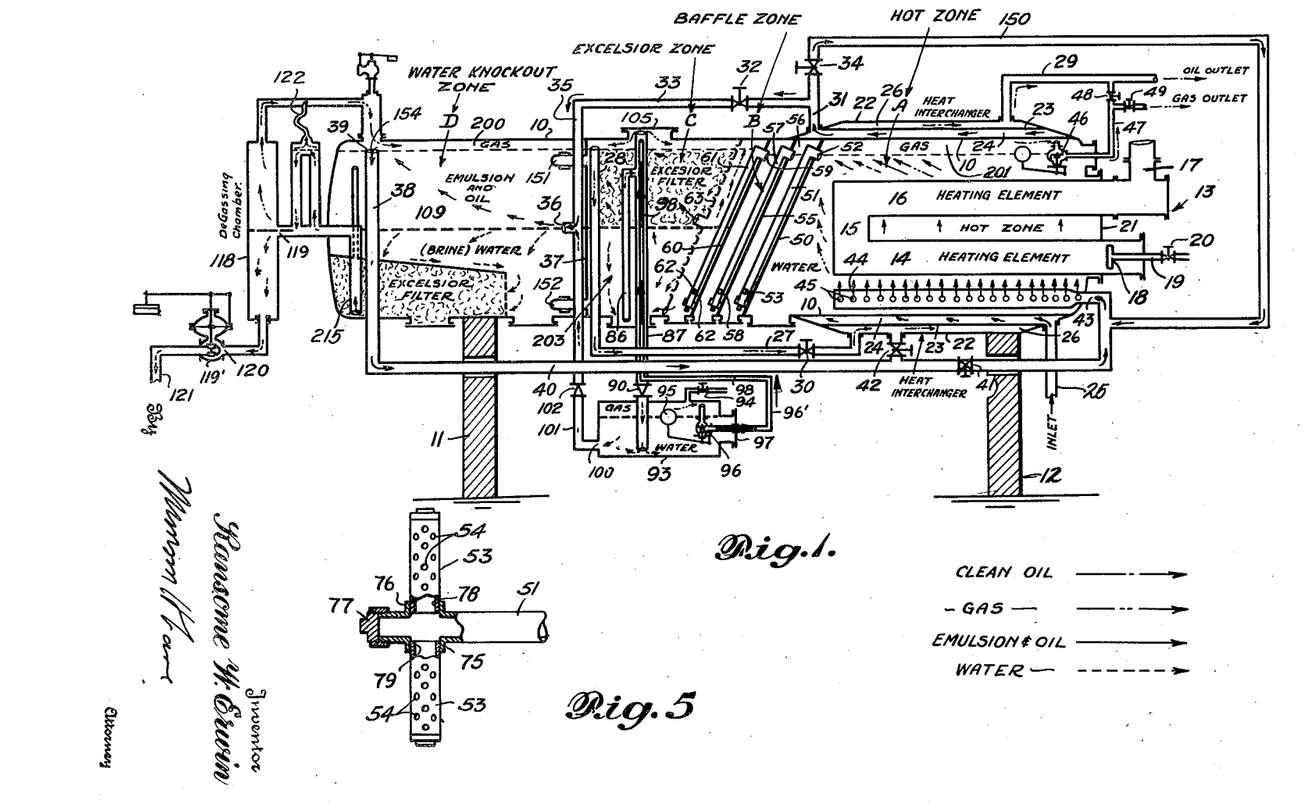
Fig. 1 is a vertical longitudinal section, largely diagrammatic in character, of my entire system, parts being shown in elevation.
Fig. 5 is a fragmentary detail view of a portion of one of the down pipes and spreaders employed in the baffling zone.
Figure 2:
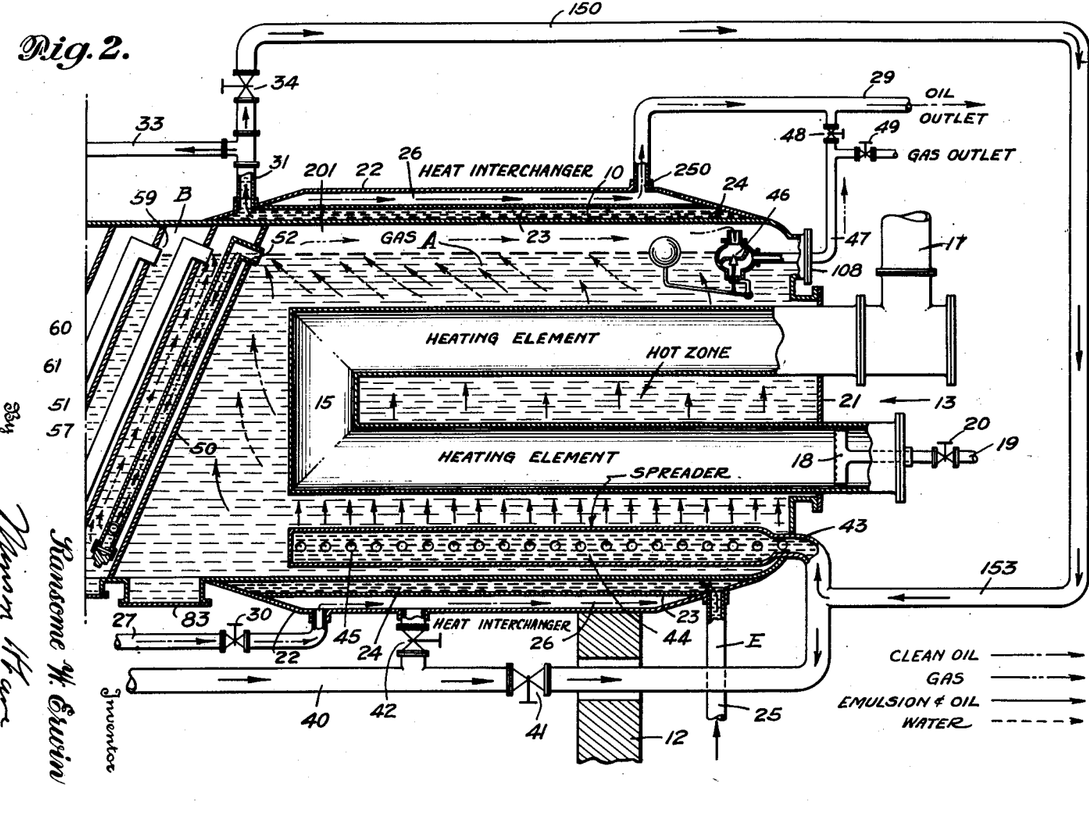
Fig. 2 is a similar view on a larger scale of the heating chamber portion of the system together with the heat interchanger surrounding the same, and a portion of the adjacent baffling chamber or zone, and portions of the pipe lines and flow control means associated therewith.

Each downpipe 51, 57 and 61 has collars 75 and 76 and plugs 77 to facilitate cleaning out of the down pipes, and exchanging nipples 78 and 79 to vary the size of the holes 53 for a given amount of liquid to be handled, see Fig. 5.

Each of the individual sections of the baffling and washing zone B may be inspected and cleaned through handholes 80, 81 and 82 located at the bottom of the chamber B. The heating chamber A may be inspected and cleaned through a manway 83 adjacent manway 80 in the chamber B.

FILTERING AND SETTLING CHAMBER C

The oil and emulsion leave spreader 62 through perforations therein similar to the perforations in spreaders 54 and 58, and pass upward under perforated plate 63. Plate 63 has projected teat like openings 64 therein. The oil largely separated from the water passes through these teat like openings 64 and the excess passes through a larger pipe opening 65 and is introduced into the filtering or settling or excelsior zone C. In some instances no filter medium is required here, only settling of the oil. Any gas traveling with the oil passes up perforated plate 63, following the path of least resistance, through perforations at top of plate 63 into gas zone above oil zone in section C, thus by-passing oil filter-settling zone and not agitating same.

To leave the chamber C the fluid undergoing treatment must pass up and across this zone through the filtering material 190 therein to reach outlet riser 28. By now it has been purged of all water and is substantially clean oil. The water passes downwardly through the excelsior into a lower zone 203.

Some water from the spreader 62 passes through an opening 85 beneath the spreader plate 63 and across the lower portion of zone 203 to the entrance to riser pipe 86, then passes up through the pipe 86 and over to the downpipe 87 through which it passes downwardly and then out at 88 to pipe 89, then through check valve 90 and pipe 91 into the lower portion of a closed pressure chamber 93. Displacement gas under pressure from any suitable source enters the upper portion of the chamber 93 through a valve 94 steadily and continuously.

When the liquid level is low in chamber 93 and the float 95 of valve 96 is down, thereby opening valve 96, the gas from the upper portion of pressure chamber 93 passes out through vent valve 96 and exit pipe 96' leading through plate 97 in the end of chamber 93 into a pipe 98 inside the down pipe 87 and on up into the gas zone 204 at the top of the filter zone C.

Water from the chamber C enters the pressure chamber 93 since gas is being vented as described, whereupon the liquid level in chamber 93 rises, thus raising the float 95 which finally closes valve 96. Under such conditions gas pressure builds up within the chamber 93 and forces water out of the chamber 93 at point 100 into pipe 101 through check valve 102 into the lower portion of pipe 35. This water joins the cold incoming untreated fluids at point 103 and passes through opening 36 into the knockout chamber D. When the liquid level in pressure chamber 93 falls the float 95 falls, excess gas pressure is released through valve 96 and accumulated water in the lower zone 203 of the filter chamber passes over riser pipe 86 and downpipe 87 and refills the pressure chamber 93 with hot water, repeating the emptying performance.

Figure 6:
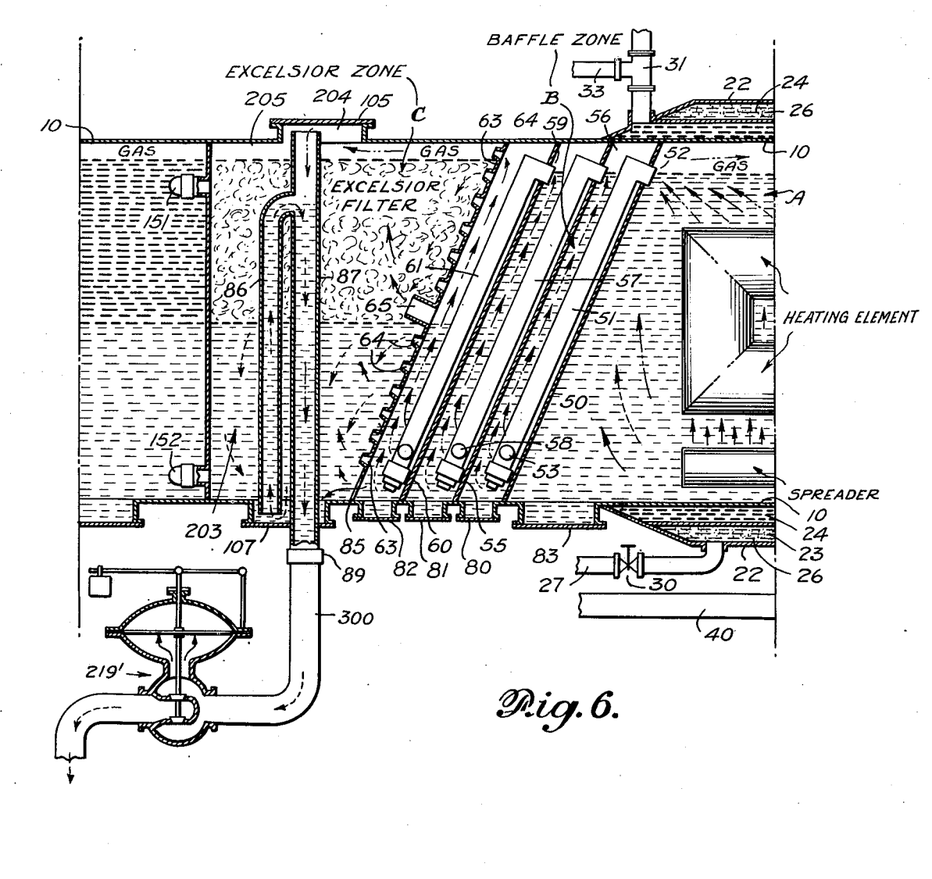
Fig. 6 is a second or modified arrangement showing portions of the filtering and knockout zones, and with a hot water discharge connection leading from the filtering zone directly through a diaphragm dump valve to a disposal pit or well without passing through the water knockout chamber.

If the oil and flowing conditions of a lease are such that most of the water is dropped out in the free water knockout, then there is no advantage in returning a small volume of hot water from the hot oil chamber C to the free water knockout chamber D. In this case no gas pressured return chamber 93 would be economical or practical. It would be preferable to attach a diaphragm dump valve 219' similar to valve 119' to pipe 89 leading from the chamber C through connecting pipe 300 and send the water from the chamber C directly to the disposal pit or well along with the water from the dump valve 119'. See Fig. 6 showing dump valve arrangement for hot water discharge from the chamber C. With such arrangement no inner pipe 98 would be required within the pipe 87.

The clean oil which accumulates at the top of filtering and settling chamber C enters the discharge riser 28 at point 104, which is a few inches below the top of the chamber to permit existence of a gas zone 205 which further occurs at 204 below the manhole 105. As previously described the hot, clean oil passes down pipe 28 and out at point 106 through pipe 27 and opened valve 30 to the outer jacket 26 of the heat exchanger surrounding the heating chamber A. This oil passes upwardly and around the inner jacket, giving up its heat to the cold untreated fluid in the inner jacket zone and to the atmosphere. The oil passes out at point 250 through pipe 29 which leads it to a clean oil storage (not shown). Any gas that accumulates in the zones 204 and 205 above the filter chamber C also goes with the clean oil to storage tanks.

Excelsior in the upper zone of chamber C may be removed and replaced through upper and lower manways 105 and 107. Risers 86 and 87 are built on the manway plate of the lower manway 107, thus permitting easy removal for adjustments and cleaning. Float valves 96 and 46 may be removed on plates 97 and 108 in chambers 93 and A respectively.

FREE WATER KNOCK-OUT CHAMBER D

All of the water that separates out of the emulsion in the upper zone 109 of free water knockout chamber D and flows by gravity into the lower water zone 110 runs down inclined plate 111 which with perforated vertical plate 112 forms a housing for an excelsior body 113 for filtering the water. The water enters perforated plate 112 through openings 114 and passes through the excelsior filtering material to the entrance to outlet riser 215 located near the bottom of the tank. The water passes up and out into a liquid level controlling riser comprising a pair of adjustable water legs 116, 116, and over the top thereof at 117 and down and into a degassing chamber 118 at point 119. The water leaves chamber 118 at its bottom and enters a diaphragm dump valve 119' at point 120, and leaves through pipe 121 leading to a pit or subsurface system (not shown).

The lower passage between the legs of the riser 116 may be normally closed either by means of a valve or plug so that under the influence of gas or flowing pressure in the system the water passing from the system passes first over the adjustable riser 116, whereby the liquid level within the treater may be regulated as desired. Any suitable means for making the riser adjustable may be employed. As shown the riser 116 is built to rotate on collars or unions to permit raising or lowering for level adjustments. A flexible hose pipe 122 connects the top portion 117 of riser 116 into gas pipe 123 which returns gas to riser 124 opening into the top of chamber D. The construction and function of the riser 116 are similar to those of the siphons or risers 57 and 58 disclosed in my Patent No. 2,261,057, which serve to control the liquid levels in the tanks to which they are applied. Other liquid level controls may be employed if desired, but this form of adjustable hydrostatic control has been found to be satisfactory in actual practice. The pipe 123 also vents gas from degassing chamber 118. The riser 124 communicates with the gas zone 200 in the upper part of the free water knockout chamber D. Above the riser 124 is a safety release valve 126 for fluids in case of undue pressures on the system.

Any oil removed from the water in the excelsior filter zone 113 beneath partition 111 accumulates under the partition and flows upwardly to an outlet 130 to a riser pipe 131 slightly removed from pipe 215, which discharges the oil at point 132 into upper oil zone 109 of the chamber D.

Excelsior in water filter zone 113 may be changed through a manway 140. Access to the free water knockout zone in chamber D may be had through manway 141 in the bottom of the tank.

If only a little water is to be handled for some time after the treater is first installed, then it is desirable to use the free water knockout zone D as a final hot oil settling chamber. In such event the valves would be manipulated as follows: close valve 32 in pipe 33 leading to the free water knockout chamber and open valve 34 to allow fluid to flow through pipe 150 directly to the spreader 44; close valve 41 in pipe 40; open valve 42 leading to chamber 26; close valve 30 in pipe 27 and pull out the bull plugs 151 and 152 in the partition 37 which separates chambers C and D. Then the emulsion supplied from pipe 25 will pass from the inner jacket 24 of the heat interchanger directly to the spreader 44 through pipes 150 and 153, by-passing the free water knockout chamber D.

Treated oil from the upper portion 190 of chamber C will then pass through the opening made by pulling the upper plug 151 directly into the upper zone 109 in chamber D for final settling before leaving chamber D at point 154 through riser outlet pipe 38 to pipe 40 which conducts it through valve 42 into the outer jacket 26 of the heat interchanger. From this portion the course is as previously described. Water from chamber C leaves the lower zone 203 through the opening made by pulling the lower plug 152 in partition 37 and pursues its course as previously described.

The horizontal vessel 10 is supported a few feet off the ground by any desired type of support 11 and 12. The heating element 13 may be any type desired, but preferably removable on the manway plate 21 together with the smoke stack 17, burner 18, gas valve 20 and pipe 19 as more fully described in my application Serial No. 587,387, filed April 9, 1945, now Patent No. 2,495,673, dated January 24, 1950.

It will be understood that fluid pressure is relied upon as the power source for passing the fluids undergoing treatment through the successive chambers or zones of the system. The fluid entering the system through inlet 26 will be at the maximum pressure and there will be a continuous pressure drop through the remainder of the system, the final least pressure being at the clean oil outlet 29 where oil finally leaves the system to go to storage. The pressure of the entering fluid is the normal flowing pressure which, in the case of a flowing well, may be the natural pressure imparted by gas within the well, or in the case of a non-flowing well the fluid pressure may be imparted by means of a pump or the like, as is well known in the art. Thus, the incoming fluid under its normal flowing pressure will ordinarily be passed successively through the heat interchanger, then into the free water knock-out chamber D, then to the heating chamber A, and thence successively through the washing and settling chambers B and C, where the fluid is subjected to successive treatments for separating the oil, water and gaseous constituents. The only case in which outside pressure is relied upon is where liquid from the relatively low pressure chamber C is to be pumped into the relatively high pressure chamber D, in which case outside pressure in the form of gas is introduced into the system at the pressure chamber 94 and is relied upon to perform this additional pumping function.

The invention has been described in detail for the purpose of illustration, but it will be obvious that numerous modifications and variations may be resorted to without departing from the spirit of the invention.

I claim:

1. An oil-water emulsion treater comprising a tubular horizontally disposed casing including a baffling chamber having a series of spaced parallel inclined walls extending completely across the interior of the casing and dividing said chamber into separate washing and baffling zones, each wall having an opening near the upper portion thereof, and a corresponding number of down pipe and spreader units, one supported on the upper inclined surface of each wall, each said unit including a down pipe member having an inlet portion communicating with the opening in its respective wall and having an outlet member comprising a laterally extending perforated pipe communicating with the down pipe adjacent the lower portion thereof, and pressure means for passing fluid undergoing treatment through the successive units of the series.

2. An emulsion treater as set forth in claim 1 wherein each separate zone contains a gas chamber at the top thereof, said successive gas chambers having progressively decreasing pressures.

3. In an emulsion treater, a water knockout chamber including an upper oil zone and a lower water zone, a filtering chamber within the water zone having filtering material therein, said chamber including an inclined upper wall, and a substantially vertical end wall perforated below the upper portion thereof, means for supplying emulsion to the knockout chamber at the oil and water interface, means for withdrawing oil from the upper zone, means for withdrawing water from the lower portion of the filtering chamber, and an oil return pipe connecting the under surface of the upper portion of the inclined top wall of the filter chamber with the top oil zone, whereby oil which accumulates beneath said top wall may be salvaged.

4. An emulsion treater comprising a horizontally arranged cylindrical tank having heating, baffling, settling and water knockout chambers therein separated by substantially upright partitions, a heat interchange jacket surrounding the heating chamber, means for supplying emulsion fluid to be treated to said heat interchange jacket, a valved pipe connection leading from the jacket to the water knockout chamber for transferring preheated emulsion fluid thereto, a separate valved connection bypassing the water knockout chamber and leading from the heat interchanger to the heating chamber for supplying emulsion fluid thereto without passing through the water knockout chamber, a valved pipe connection leading from the upper portion of the water knockout chamber to the heating chamber for normally supplying fluid from which free water has been removed to the heating chamber, a connection leading from the upper portion of the heating chamber to the lower portion of the baffling chamber, and perforations in the partition separating the baffling and settling chambers, a connection leading from the upper portion of the settling chamber for withdrawing treated oil from the treater, and means in the partition between the free water knockout and settling chambers for selectively cutting off communication between said chambers through the partition to maintain separate chambers, or for placing the two chambers in communication so that the water knockout chamber may function as a part of the settling chamber when its water knockout function is not required.

5. An emulsion treater comprising a horizontally disposed tubular casing having upright partitions dividing the casing into separate horizontally arranged heating, baffling, settling and water knockout chambers, means for supplying emulsion fluid to be treated to the water knockout chamber for separating free water from the fluid, a water outlet pipe leading from the lower portion of said knockout chamber, a pipe connection leading from the upper portion of the knockout chamber to the lower portion of the heating chamber for supplying partially treated oil thereto, a fluid connection leading from the upper portion of the heating chamber to the lower portion of the baffling chamber, pressure means for causing flow of fluid undergoing treatment through successive chambers of the treater, an oil offtake pipe leading from the upper portion of the settling chamber for withdrawing clean oil therefrom, means for withdrawing excess gas from the top of the heating zone to avoid turbulence, and means for maintaining constant liquid levels within the casing, the incoming emulsion fluid entering the free water knockout chamber being supplied at the oil and water interface therein.

6. In an emulsion treater, a washing and baffling chamber including a series of inclined plates extending from top to bottom of the treater each having an upper opening therein, a series of downpipe and spreader units corresponding in number to the inclined plates, each having an inlet communicating with the opening in its respective inclined plate, and each unit including a downpipe and a laterally disposed spreader outlet pipe having perforations therein, and pressure means for forcing fluid through the successive units.

7. A horizontal emulsion treater comprising a heating chamber having heating means therein, a baffling chamber having baffles therein, a hot oil settling chamber, and a free water knockout chamber separated by inclined partitions, there being valved communications around the partition between free water knockout chamber and hot oil settling chamber that may be optionally opened or closed to permit use of free water knockout space as either free water knockout or additional clean oil settling space as may be desired.

8. An oil-emulsion treater comprising horizontally aligned heating, washing and settling chambers, heating means within the heating chamber, partitions separating said chambers, relatively restricted fluid passageways connecting said chambers, means for passing under pressure emulsion fluid to be treated through said successive chambers, and means for separately withdrawing oil and water from the settling chamber at different levels.

9. An emulsion treater as set forth in claim 8, wherein a free water knockout chamber is provided ahead of said heating chamber, and a fluid passage is provided connecting said knockout and heating chambers for supply pretreated emulsion to the heating chamber.

10. An emulsion treater as set forth in claim 9, wherein the heating chamber is substantially completely and intimately surrounded by a preheating jacket and incoming fluid to be treated passes through said jacket before entering the heating chamber.

11. An emulsion treater as set forth in claim 10, wherein means are provided for passing the oil withdrawn from said settling chamber in heat interchange relation to the incoming fluid entering the heating chamber.

12. An oil-emulsion treater comprising a fluid-tight casing having a plurality of horizontally aligned chambers including a heating chamber having heating means therein, a settling chamber, and a free water knockout chamber, partitions separating said chambers, restricted conduits connecting successive chambers, means for passing under pressure fluid undergoing treatment from the heating chamber through the settling chamber, valved connections for separate withdrawal of oil and water from the settling chamber from different levels therein, means for supplying fluid to be treated to the free knockout chamber, and a fluid passage connecting the upper portion of the free knockout chamber with the lower portion of the heating chamber for passing emulsion fluid from the free water knockout chamber to the heating chamber for further treatment.

13. An oil-emulsion treater as set forth in claim 12, wherein cut-off means are provided in the passage connecting the free water knockout chamber and the heating chamber, and an emulsion supply pipe leading directly to the heating chamber and by-passing the free water knockout chamber.

14. An emulsion treater as set forth in claim 13, wherein the partition between the settling chamber and the free water knockout chamber is provided with openings having removable closure means whereby the free water knockout chamber may be used as either a separate chamber or as an extension of the settling chamber as desired.

15. An emulsion treater comprising a closed horizontally disposed elongated tubular casing, upright partitions dividing the casing into separate chambers including (1) a closed free water knockout chamber, having means for supplying thereto under pressure relatively cool emulsion to be treated, and (2) a separate closed settling chamber having a lower pressure therein than the water knockout chamber adapted to contain relatively hot fluids and including a top gas pressure zone, a bottom water zone, and an intermediate oil zone, means for withdrawing water from the lower zone, pumping means for transferring the water withdrawn from the low pressure settling chamber to the high pressure free water knockout chamber, and means for separately withdrawing oil from the settling chamber.

16. An emulsion treater comprising a casing including a washing and baffling chamber, upright partitions separating said chamber into successive horizontally aligned zones, and a spreader unit for each partition comprising a down pipe having a single inlet passing through the upper portion of its respective partition, and having a perforated outlet near the bottom of the partition, said partition means extending from top to bottom of the casing, and pressure means for causing fluid to be treated to pass through said successive zones.

17. An emulsion treater comprising a casing having successesive horizontally aligned chambers including a heating chamber having a heating unit therein and a washing chamber, upright partition means extending from top to bottom of said casing and separating said heating and washing chambers, means for supplying under pressure fluid to be treated to the heating chamber below the heating unit, and a single restricted conduit connecting said heating and washing chambers to permit passage of heated emulsion from the upper part of the heating chamber into said washing chamber, said conduit having an inlet passing through the upper portion of the partition and an outlet adjacent the bottom of the washing chamber, and means for withdrawing treated fluid from the washing chamber.

18. An oil-emulsion treater comprising an elongated horizontally disposed tubular casing, partition means separating said casing into horizontally aligned treating chambers, including a heating chamber having heating means therein and a settling chamber, means for passing fluid to be treated under pressure through successive zones of said treater, a free water knockout chamber located ahead of said heating chamber, means for supplying emulsion fluid to be treated to the free water knockout chamber for separation of free water therefrom, conduit means connecting the upper portion of said free water knockout chamber with the lower portion of said heating chamber for supplying emulsion from which the free water has been separated, and conduit means for withdrawing substantially water free oil from the upper portion of the settling chamber.

19. An emulsion treater comprising a horizontally disposed elongated casing, partitions in said casing dividing said casing into separate chambers, including a heating chamber having a heating unit therein, a settling chamber and a free water knockout chamber, a heat interchange jacket surrounding the heating chamber, means for supplying emulsion fluid to be treated to said heat interchange jacket, a valved connection leading from the jacket to the water knockout chamber, a pipe connection leading from the water knockout chamber to the heating chamber, a restricted fluid passage between said heating chamber and said settling chamber, a passage leading from the upper portion of the settling chamber for withdrawing treated oil from the treater, pressure means for passing fluid through successive chambers in said treater, and means in the partition between the free water knockout and settling chambers for selectively cutting off communication between said chambers through the partition to maintain separate chambers, or for placing the two chambers in communication so that the water knockout chamber may function as a part of the settling chamber when its water knockout function is not required.

20. An oil-emulsion treater comprising a horizontally disposed tubular casing, partition means separating the casing into horizontally aligned chambers, including a heating chamber having a heating unit therein and a settling chamber, restricted conduit means connecting successive chambers to permit passage of fluid being treated to separate oil and water therefrom, means for separately withdrawing substantially oil free water and water free oil from different levels of the settling chamber, and a preheating chamber for the incoming emulsion comprising a jacket substantially completely and intimately surrounding the heating zone of the treater and having a connection leading to the heating chamber for supplying preheated fluid thereto.

21. An oil-emulsion treater comprising a horizontally disposed tubular casing, partition means separating the casing into horizontally aligned chambers, including a heating chamber having a heating unit therein and a settling chamber, restricted conduit means connecting successive chambers to permit passage of fluid being treated to separate oil and water therefrom, means for separately withdrawing substantially oil free water and water free oil from different levels of the settling chamber, a preheating chamber for the incoming emulsion, comprising a jacket substantially completely and intimately surrounding the heating zone of the treater and having a connection leading to the heating chamber for supplying preheated fluid thereto, and an outer jacket for cooling oil withdrawn from the settling chamber, said outer jacket surrounding the emulsion heating jacket and being in heat interchange relation thereto.

22. An oil-emulsion treater comprising a horizontally disposed tubular casing, partitions separating said casing into horizontally aligned heating and settling chambers, a heating unit in said heating chamber, an emulsion preheating jacket substantially completely and intimately surrounding the portion of the casing containing the heating means, and in heat interchange relation therewith, conduit means connecting said preheating jacket with said heating chamber for supplying preheated emulsion thereto, conduit means for passing heated emulsion from the heating chamber to the settling chamber, and conduit means for separately withdrawing oil and water from the settling chamber at different levels.

23. In an emulsion treater, a water knockout chamber having an upper gas zone, a lower water zone and an intermediate oil zone, conduit means for withdrawing oil from the upper portion of the oil zone, a substantially vertical degassing chamber outside of the treater, a water outlet pipe opening into the water zone and leading to the degassing chamber, an inverted U-tube having its two legs communicating with said water outlet pipe intermediate the knockout chamber and the degassing chamber, a gas return pipe leading from the upper portion of the degassing chamber to the gas zone of the water knockout chamber, a flexible pipe connecting the upper portion of the U-tube with said gas return pipe, a water outlet leading from the lower portion of said degassing chamber, and conduit means for introducing an oil and water mixture to the knockout chamber.

24. In a horizontal cylindrical emulsion treater, means for maintaining a predetermined liquid level within the treater, a water knockout chamber within the treater having an upper oily zone and a lower watery zone, means for supplying emulsion to be treated thereto at the oil and water interface of said zones, a filtering chamber located within the watery zone having an inclined top wall and an upright end wall having an opening below the top wall, a water outlet pipe having its opening at the lower portion of the filtering chamber, and an oil return pipe communicating with the top of said inclined wall and discharging into the upper oily zone, and means for withdrawing oil from the upper portion of the oil zone at a point substantially removed from the emulsion supplying means.

25. A substantially horizontal closed oil-water emulsion treater including a relatively low pressured hot zone and a relatively high pressured cold free water knockout zone, a partition separating the two zones, means for supplying fluid to be treated under pressure to the free water knockout zone, wherein the fluid is separated into watery and oily layers, a conduit connecting the oily layer of the water knockout zone with the lower portion of the heated zone, wherein further separation of the oily portion into oil and water layers takes place, means for withdrawing the oil from the heated zone of the treater, means for pumping hot water from the low pressured hot zone and introducing it into the high pressured cold free water knockout zone, means for withdrawing water from the lower portion of the water knockout zone of the treater at a point substantially removed from the point at which the water from the hot zone is introduced, and means for maintaining a regulated liquid level within the treater.

26. An emulsion treater comprising a horizontally disposed elongated tubular casing, partition means extending from top to bottom of the casing and dividing the casing into separate horizontally aligned emulsion treating chambers, means including restricted conduits connecting successive chambers for producing pressure drop of fluid in passing through said chambers, means for introducing under pressure emulsion fluid to be treated containing water, oil and gas to one of said chambers, whereby the fluid is caused to flow through the successive treating chambers with resulting separation of oil, water and gas from the fluid and formation of gas zones of varying pressures at the upper part of each of the individual chambers, means for maintaining a predetermined liquid level within the treater, and means for separately withdrawing oil, water and gas from different levels of the treater.

27. An emulsion treater as set forth in claim 26 including an emulsion heating chamber having a heater therein, and means for directing influent fluid to be treated against the under side of the heater.

28. An emulsion treater as set forth in claim 27 having gas withdrawal means communicating with the upper portion of the heating chamber.

29. An emulsion treater as set forth in claim 27 including a washing and baffling chamber separate from the heating chamber and arranged to receive emulsion fluid which has been treated in said heating chamber.

30. An emulsion treater as set forth in claim 29 which includes a settling chamber in horizontal alignment with the heating and washing and baffling chambers, and a perforated wall as one of said partition means separating the washing and baffling chamber from said settling chamber.

31. An emulsion treater as set forth in claim 29 which includes a filtering chamber in horizontal alignment with the heating and washing and baffling chambers, porous filtering material in said filtering chamber, and a perforated wall as one of said partition means separating said filtering chamber from the washing and baffling chamber.

32. An emulsion treater comprising a closed horizontally disposed elongated tubular casing, upright partitions separating the casing into separate horizontally aligned treating chambers including a heating chamber having a heating unit therein, a settling chamber, and a free water knockout chamber ahead of the heating chamber, inlet means for supplying emulsion fluid to be treated containing free water to the water knockout chamber, conduit means for withdrawing separated out water from the treater at the lower portion of the water knockout chamber, means including a conduit opening into the water knockout chamber at a level above the fluid inlet and water outlet, and opening into the heating chamber below the heating unit for supplying thereto emulsion from which free water has been separated, conduit means connecting the upper portion of the heating chamber to the settling chamber for supplying heated fluid thereto, means including a conduit communicating with the lower portion of the settling chamber and leading to the water knockout zone for returning hot treated out water under pressure thereto, and an oil outlet conduit leading from the upper portion of the settling chamber.

33. An emulsion treater as set forth in claim 32 wherein the means for returning hot treated out water to the water knockout chamber includes a float controlled gas pressure chamber located outside the treater casing.

34. An emulsion treater comprising a longitudinally disposed tubular casing having a plurality of upright partitions therein separating the casing into a series of axially aligned treating chambers arranged in the order named, comprising a heating chamber having heating means therein, a baffling chamber having baffling means therein, a settling chamber, and a free water knockout chamber, conduit means for supplying under pressure emulsion fluid to be treated, said conduit means including branch connections leading to the free water knockout chamber and to the heating chamber respectively, valve means controlling said branch connections whereby the emulsion fluid may be supplied to either chamber as desired, the free water knockout and settling chambers being arranged adjacent one another and separated by a partition having a controlled opening therein, whereby the water knockout chamber may serve as an additional settling space when the entering emulsion fluid is directed to the heater.

35. A process of operating an emulsion treater having a plurality of horizontally aligned chambers separated by upright partitions provided with restricted connecting passageways, each chamber containing superposed liquid and gas zones, the gas zones varying in pressure in successive chambers, said process comprising passing emulsion fluid to be treated initially containing oil, gas and water successively through said chambers and restricted passageways to separate the constituents thereof under varying gas pressure conditions, withdrawing water from at least one of said chambers, and withdrawing the oil and gas separately from the water.

36. A process as set forth in claim 35 wherein excess gas is withdrawn from at least one of the chambers.

37. A process as set forth in claim 35 wherein heating, washing and settling operations are performed in successive chambers of the treater.

38. A process of operating a closed emulsion treater including a heating chamber, a settling chamber, and a free water knockout chamber arranged in horizontal alignment, and having a partition separating the chambers, which comprises introducing emulsion fluid to be treated and containing oil, gas and watery constituents into the water knockout chamber and allowing the free water and gas to separate out in said chamber, thereby forming superposed water, oily and gas layers, withdrawing the oily liquid from the upper portion of the free water knockout chamber and passing the same to the heating chamber and then to the settling chamber whereby further separation into superposed water, oil and gas layers is effected, withdrawing clean oil and gas from the upper portion of the settling chamber, withdrawing hot separated out water from the lower portion of the settling chamber, and introducing the same into the free water knockout chamber at the oil and water interface of said knockout chamber, thereby conserving the heat of said water for treatment of the incoming emulsion fluid, and withdrawing excess water from the lower portion of the free water knockout chamber.

39. An emulsion treater comprising a closed horizontally disposed elongated tubular casing, upright partitions dividing the casing into separate horizontally aligned chambers including (1) a free water knockout chamber having means for supplying relatively cool emulsion thereto to be treated, and (2) a separate closed filtering and settling chamber containing relatively hot fluids and including a top gas pressure zone, a bottom water zone and an intermediate clean oil zone, and means for transferring relatively hot water from the water zone of the filtering and settling chamber to the relatively cool knockout chamber at the oil and water interface of said knockout chamber, and means for withdrawing gas and oil from the settling chamber.

40. An emulsion treater as set forth in claim 39 wherein the means for transferring water from the settling chamber to the water knockout chamber is actuated by external gas pressure.

RANSOME W. ERWIN.

REFERENCES CITED

The following references are of record in the file of this patent:

UNITED STATES PATENTS

| Number | Name | Date |
|---|---|---|
| 966,022 | Johnson | Aug. 2, 1910 |
| 1,052,963 | Reid | Feb. 11, 1913 |
| 1,405,129 | Harris | Jan. 31, 1922 |
| 1,559,035 | Egloff et al. | Oct. 27, 1925 |
| 1,624,092 | Coleman | Apr. 12, 1927 |
| 1,648,558 | Meston et al. | Nov. 8, 1927 |
| 1,690,537 | Hele-Shaw et al. | Nov. 6, 1928 |
| 1,818,480 | Hoppe | Aug. 11, 1931 |
| 2,049,068 | Loupe | July 28, 1936 |
| 2,179,131 | Millard | Nov. 7, 1939 |
| 2,211,171 | Self | Aug. 13, 1940 |
| 2,261,057 | Erwin | Oct. 28, 1941 |
| 2,261,100 | Erwin | Oct. 28, 1941 |
| 2,261,101 | Erwin | Oct. 28, 1941 |
| 2,273,915 | Willman | Feb. 24, 1942 |
| 2,342,950 | Lovelady et al. | Feb. 29, 1944 |
| 2,348,167 | Erwin | May 2, 1944 |
| 2,354,856 | Erwin | Aug. 1, 1944 |
| 2,357,189 | Erwin | Aug. 29, 1944 |
| 2,384,222 | Walker | Sept. 4, 1945 |
| 2,398,338 | Walker | Apr. 9, 1946 |
| 2,420,115 | Walker et al. | May 6, 1947 |
| 2,457,959 | Walker | Jan. 4, 1949 |

FOREIGN PATENTS

| Number | Country | Date |
|---|---|---|
| 424,395 | Germany | Jan. 26, 1926 |
| 562,150 | Germany | Oct. 22, 1932 |